Patented Mar. 12, 1940

2,193,476

UNITED STATES PATENT OFFICE 2,193,476

CUTTING OIL

Frank W. Corkery, Crafton, Pa., assignor to Pennsylvania Industrial Chemical Corporation, a corporation of Pennsylvania No Drawing. Application July 1, 1938, Serial No. 217,079

9 Claims. (Cl. 87—9)

This invention relates to a cutting oil.

The cutting oil of my invention is a composition primarily characterized by the inclusion of a preponderating, or at least a large proportional content, of a sulphurized oil of the sort which I herein term "dipolymer" oil. This dipolymer oil is of cyclic composition, and has its more proximate derivation in the light oil which is distilled over in the by-product coking of coal, or the light oil which is distilled from the tar of by-product coking, and purified by the removal of tarry acids and bases. The immediate derivation of the dipolymer oil is either from still residue produced residually in the fractionation and purification of light oil in the production of solvent naphthas, benzol, toluol, or the like, or is produced by polymerization conducted in crude heavy solvent naphtha.

Briefly to discuss the still residue from which dipolymer oil may be obtained, such still residue may be produced from the fractionation of light oil in initial, or "crude," stills; may be obtained as a residue of distillation after acid purification and neutralization of the light oil or light oil fractions; or may be obtained as bottoms in the stills by which a fractionation into No. 1 crude solvent naphtha (xylol) and No. 2 crude heavy solvent naphtha is effected. It is usually a mixture from all these sources, and is in degree contaminated by sulphates and sulphonates.

The various still residues, because of the heat treatment, or acid purification treatment, or both of such treatments, to which the light oil is subjected, comprise a large percentage of polymers of the light oil unsaturates, such as coumarone and indene in varying proportions, and traces of styrene. While some of such polymers are in a stage of polymerization which forms solid resin, others are in the form of dimers, and it is the dimers of the polymerizable reactives of the light oil which largely constitute dipolymer oil as derived from still residue. To recover the dipolymer oil from the still residue, the still residue is subjected to distillation. Distillation desirably may be conducted under a subatmospheric pressure of 20 inches of mercury, and with steam, at a still temperature of about 550° F. If naphthalene and hydrocarbons of solvent grade are present these are first distilled off, and the dipolymer oil then comes over as the still temperature is increased to the point at which distillation to a solid residuum is effected. This dipolymer oil is readily condensed and recovered.

Dipolymer oil is also produced by polymerization in crude heavy solvent naphtha, or equivalent liquid derived from coke-oven light oil, drip oil, or the like, by some polymerization process of the same type as that which produces solid coumarone type resin. In accordance with the conditions of the polymerization process, a greater or lesser proportion of the polymerizable resin-forming reactives remain in the first stage of polymerization as dimers to form dipolymer oil, and is separated by steam distillation from the higher polymers forming solid resin. A large proportion of the reactives present go to form dipolymer oil if the conditions of the polymerization process be such that a very moderate catalytic effect is exerted during the polymerization process.

The dipolymer oil with which I am herein concerned may be obtained in either manner as above described, or may be a mixture of dipolymer oil obtained from still residue and dipolymer oil obtained from a polymerization process conducted in crude solvent naphtha, or its equivalent. If the dipolymer oil is derived from the still residue, above defined, such still residue is preferably purified by removal of sulphonates prior to the recovery of the dipolymer oil. Such purification, by removal of sulphonates, may be effected by solvent separation and stratification, as in my Patent No. 2,135,427, dated November 1, 1938, and my Patent No. 2,172,437, dated September 12, 1939, or by decomposition and precipitation as in my co-pending application Serial No. 182,804, filed December 31, 1937.

Further to define the "dipolymer" oil, or oils, it is an oily substance composed almost exclusively of the dimers of the light oil unsaturates (such as coumarone and indene), with an almost negligible proportional content of high boiling cyclic oils, and reaction products of the various primary components. It has a specific gravity of about 1.055 at 60° F. It has a viscosity of about 100 Saybolt seconds at 210° F., and a viscosity of about 270 Saybolt seconds at 100° F. Preponderantly it boils within the approximate range of 300° C. to 370° C., and a large part of its weight distills close to 340° C. As initially produced, it is of a pale yellow color, and is non-volatile at ordinarily encountered temperatures.

It may further be explained that dipolymer oil, consisting as it does in substantial exclusion of the dimers of coumarone and indene, is in effect a fluid coumarone-indene resin; and it is, therefore, possible to use in making my cutting oil composition a soft coumarone-indene resin, containing a large proportion of the dimers of coumarone and indene, and a negligible proportion of relatively high polymers, such as those higher than the fourth stage of polymerization. I have found that solid coumarone-indene resin as used in my cutting oil should not exceed a melting point of about 80° C., and preferably does not substantially exceed a melting point of 50° C. to 60° C. Throughout the remainder of the specification and the claims, I, therefore, use the term "soft coumarone-indene resin" generically to embrace both the dipolymer oil itself and a solid resin, as above described, containing a substantial proportion of the dipolymer oil. I prefer to use dipolymer oil per se for the reason that the solid resin, having a melting point above normal atmospheric temperatures has a wider capability in the arts, and is, therefore, inherently a more valuable commercial material than the dipolymer oil which flows freely at normal atmospheric temperatures. It is also possible to react the dipolymer oil itself with a higher proportional weight of sulphur than the soft but solid coumarone-indene resin, and it thus is capable of sulphurization to a point adequate to meet certain special conditions of use.

In sulphurizing the resin preparatory to its inclusion in a cutting oil composition, the resin is heated to a relatively high temperature, and the sulphur is then introduced, and heating continued. During the heating there is an evolution of hydrogen sulphide ($H_2S$), which indicates the progress of reaction. Assuming that the soft resin is a dipolymer oil per se, reaction with the sulphur has increased the molecular weight of the dipolymer oil to substantially above 226, the normal molecular weight of the dipolymer oil, in accordance with the stage to which sulphurization is carried. There is thus actual chemical reaction between the indene and coumarone polymers and the sulphur. The sulphur may be introduced into the structure of the polymers at several possible points.

A specific example of procedure in preparing sulphurized soft coumarone-indene resin, and a formula for my cutting oil composition may be given as follows:

Example No. 1

A batch of 6000 pounds of dipolymer oil was heated to a temperature of about 340° F., and 1200 pounds of sulphur was added to it. Heating was continued, with evolution of hydrogen sulphide, to a stage at which drops of the batch placed on a piece of glass remained clear. The batch was then considered to be finished, and was found to weigh about 6600 pounds. One-half of the sulphur included in the batch had, therefore, gone off in the form of hydrogen sulphide, and one-half of the sulphur was received into chemical combination in the coumarone and indene polymers, each atom of sulphur replacing two hydrogen atoms therein.

The sulphurized resin resultant from the above reaction thus contained approximately 10% sulphur, and provides the sulphurized resin base in the cutting oil composition. It was included in the following formula for cutting oil:

|  | Parts by weight |
|---|---|
| Sulphurized resin base | 30 |
| Dipolymer oil | 50 |
| Fish oil (exemplary of fatty oils generally) | 20 |

Example No. 2

Sulphurized soft coumarone-indene resin prepared as in Example No. 1 was included in a formula consisting of:

|  | Parts by weight |
|---|---|
| Sulphurized resin base | 30 |
| Dipolymer oil | 70 |

Example No. 3

|  | Parts by weight |
|---|---|
| Sulphurized resin base | 30 |
| Dipolymer oil | 30 |
| Mineral oil (200 Saybolt seconds at 100° F.) | 20 |
| Fish oil (exemplary of fatty oils generally) | 20 |

Example No. 4

Sulphurized soft coumarone-indene resin prepared as in Example No. 1 was included in a formula consisting of:

|  | Parts by weight |
|---|---|
| Sulphurized resin base | 30 |
| Dipolymer oil | 50 |
| Mineral oil (200 Saybolt seconds at 100° F.) | 20 |

Of the formulae given in these four examples, the formulae of Examples 1 and 3 are preferred, for the reason that the inclusion of some proportion of fatty oil in the composition adds to the film strength of the composition when used as a lubricant. This cutting oil composition as illustrated in all the formulae is of particular utility in lubricating for high speed cutting operations generally. Previously the standard oil used in high speed cutting has been lard oil, and I have found that my cutting oil made in accordance with Formulae 1 and 3, as given above, has at least four times the life of lard oil in such service. The compositions of Formulae 2 and 4 are satisfactory for the usual thread cutting operations. Due to its sulphurized content, the cutting oil composition gives a good cooling effect, and results in the cutting of clean threads, cut without chattering. In general it may be stated that the lubrication value of the composition is excellent.

As an example of the sulphurization of the solid resin, and its inclusion in a cutting oil, I give the following:

Example No. 5

A batch of 6000 pounds of coumarone-indene resin melting at 50° C. (ball and ring method) was heated to a temperature of about 340° F., and 1000 pounds of sulphur was added to it. Heating was continued, with evolution of hydrogen sulphide, to a stage at which drops of the batch placed on a piece of glass remained clear. The batch was found to weigh about 6500 pounds. This example of the "soft coumarone resin", does not, for an equal weight of the resin, readily acquire so high a content of sulphur as does the dipolymer oil.

The sulphurized product may be used in various cutting oil formulae, such as those given above under Examples 1, 2, 3, and 4, as the "sulphurized resin base" of the formulae.

When a particularly marked cooling effect is desired, this may be obtained without varying the proportions of the formulae, by intensifying sulphurization of dipolymer oil. In this connection it will be noted that dipolymer oil per se is used as the resinous starting material, because it possesses a greater capacity to react with sulphur than does the solid form of the resin. The following may be given as exemplary of procedure including an increased quantity of sulphur in the sulphurized base:

Example No. 6

A batch of 6000 pounds of dipolymer oil was heated to a temperature of about 340° F. and 2500 pounds of sulphur was added. Heating was continued, with evolution of hydrogen sulphide, to a stage at which drops of the batch placed on a piece of glass remained clear; and was then continued further to a stage at which evolution of hydrogen sulphide subsided, and became almost imperceptible.

The product was found to weigh about 7200 pounds showing approximately a 20% sulphur content.

I have found a highly desirable starting material for the sulphurized resin base of the cutting oil composition to be the still residue, hereinabove-defined, purified by removal of sulphonates, and preferably topped of most of its solvent content. The following may be considered as exemplary of the use of such starting material:

Example No. 7

The starting material was aromatic still residue, purified and topped to a melting point of about 35° C. (ball and ring method). The still residue, so purified and topped, has been deprived not only of its content of sulphonates, but also of all its solvent content and a proportion of its dipolymer oil amounting to less than 30% of that content.

To a batch of 5000 pounds of such still residue, heated to about 340° F., I added 2000 pounds of sulphur, and continued to heat the batch beyond the stage of clarity when dropped on glass, to a stage at which evolution of hydrogen sulphide had subsided. The weight of the product was about 6000 pounds. This product also may be included in various cutting oil formulae, such for example as those given above.

The use of such still residue for sulphurization, and inclusion in a cutting oil composition, sounds in economy because of the low cost of the initial starting material (unpurified and untopped still residue), and because it minimizes the steps performed in preparing a starting material for sulphurization.

It is a fact that I am able to carry sulphurization of the resin much further than is illustrated in any example. Since, however, I am concerned with making up a cutting oil composition, and with preparing a sulphurized ingredient for such composition, I do not wish to sulphurize the soft resin to a stage at which a hard solid, insoluble in the other ingredients of the composition, is produced. In the examples a temperature of about 340° F. is given in each. I have found a temperature in excess of 275° F. to be necessary in effecting the reaction. The batch temperature may be as high as the boiling point of the resin permits; that is it should not exceed about 570° F. A temperature of about 340° F. is adequate to effect reaction, and adequate to cause it to take place with reasonable celerity.

I claim as my invention:

1. The herein described cutting oil composition comprising soft coumarone-indene resin of melting point no higher than 80° C. and containing by reaction with the sulphur radical a substantial content of sulphur, and at least one additional oil having lubricating qualities.

2. The herein described cutting oil composition comprising soft coumarone-indene resin of melting point no higher than 80° C. and containing by reaction with the sulphur radical a substantial content of sulphur, and dipolymer oil fluid at normal room temperature and consisting in substantial entirety of the dimers of coumarone and indene.

3. The herein described cutting oil composition comprising soft coumarone-indene resin of melting point no higher than 80° C. and containing by reaction with the sulphur radical a substantial content of sulphur, and saponifiable oil.

4. The herein described cutting oil composition comprising soft coumarone-indene resin in the form of the dipolymer oil consisting in substantial entirety of the dimers of coumarone and indene and fluid at normal room temperature, said dipolymer oil containing by reaction with the sulphur radical a substantial content of sulphur, and at least one additional oil having lubricating qualities.

5. The herein described cutting oil composition comprising soft coumarone-indene resin in the form of the dipolymer oil consisting in substantial entirety of the dimers of coumarone and indene and fluid at normal room temperature, said dipolymer oil containing by reaction with the sulphur radical a substantial content of sulphur, and an additional content of the said dipolymer oil in its normal unsulphurized condition.

6. The herein described cutting oil composition comprising soft coumarone-indene resin in the form of the dipolymer oil consisting in substantial entirety of the dimers of coumarone and indene and fluid at normal room temperature, said dipolymer oil containing by reaction with the sulphur radical a substantial content of sulphur, and a saponifiable oil.

7. The herein described cutting oil composition comprising soft coumarone-indene resin resultant from purifying by removal of sulphonates and topping by removal of solvents a still residue from the purification and distillation of light oil derived in the by-product coking of coal, said soft coumarone-indene resin containing by reaction with the sulphur radical a substantial content of sulphur, and at least one additional oil having lubricating qualities.

8. The herein described cutting oil composition comprising soft coumarone-indene resin resultant from purifying by removal of sulphonates and topping by removal of solvents a still residue from the purification and distillation of light oil derived in the by-product coking of coal, said soft coumarone-indene resin containing by reaction with the sulphur radical a substantial content of sulphur, and dipolymer oil fluid at normal room temperature and consisting in substantial entirety of the dimers of coumarone and indene.

9. The herein described cutting oil composition comprising soft coumarone-indene resin resultant from purifying by removal of sulphonates and topping by removal of solvents a still residue from the purification and distillation of light oil derived in the by-product coking of coal, said soft coumarone-indene resin containing by reaction with the sulphur radical a substantial content of sulphur, dipolymer oil fluid at normal room temperature and consisting in susbtantial entirety of the dimers of coumarone and indene, and a saponifiable oil.

FRANK W. CORKERY.